Jan. 3, 1933. G. B. SCHEIBELL 1,892,855
SOUND RECORDING APPARATUS
Filed March 12, 1931 2 Sheets-Sheet 1
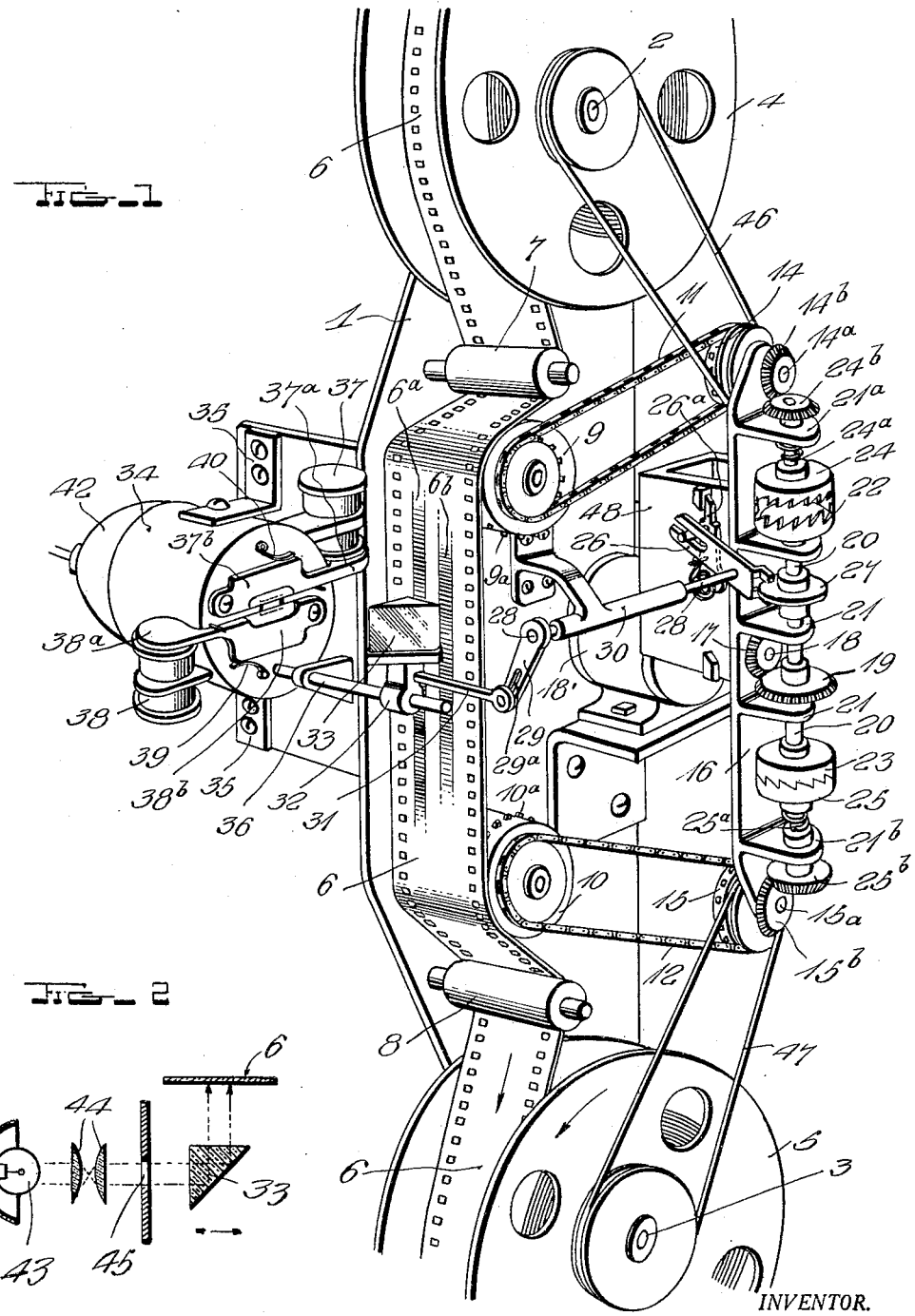

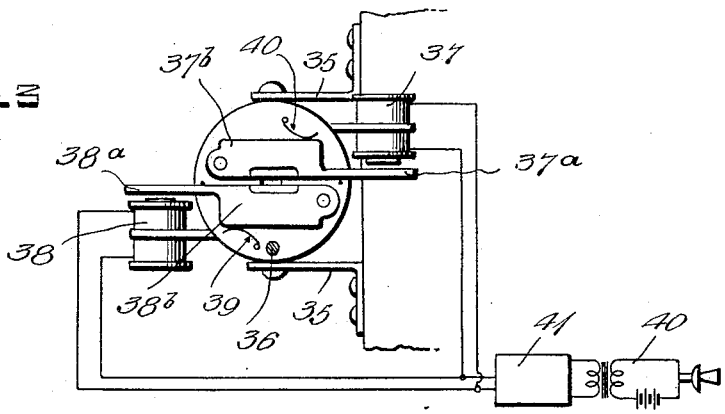
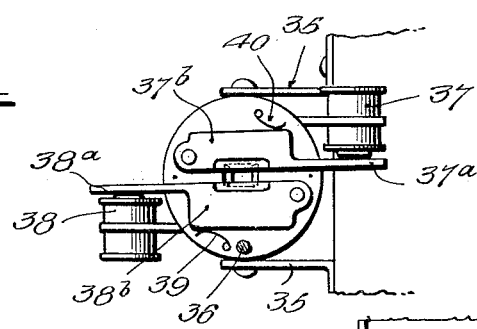
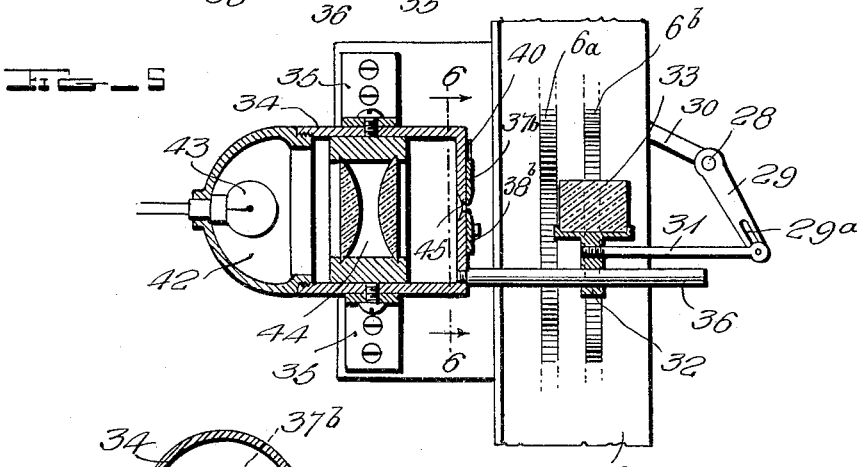
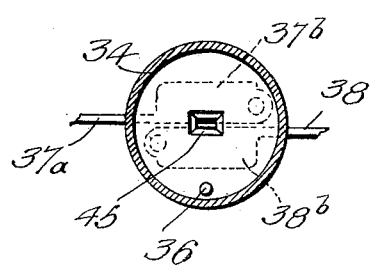

Patented Jan. 3, 1933

1,892,855

UNITED STATES PATENT OFFICE

GORDON BROWN SCHEIBELL, OF NEWARK, NEW JERSEY

SOUND RECORDING APPARATUS

Application filed March 12, 1931. Serial No. 522,096.

My invention relates broadly to a sound recording system and more particularly to an apparatus for reversibly feeding a film past a recording head to have a multiple sound track recorded thereon.

One of the objects of my invention is to provide a compact form of sound recording apparatus for recording a multiple track sound channel on a film which is moved adjacent the recording head first in one direction and then in the reverse direction with means for shifting the position of the variable light beam transversely of the film as the direction of the film is reversed.

Another object of my invention is to provide a compact construction of apparatus for recording multiple channel sound records on film with means for coordinating the operation of a recording head with the movement of the film.

A further object of my invention is to provide a mechanism for shifting a prism transversely of a film as the film is moved to either of two limiting positions, the prism being shifted for directing a variable beam of light upon selected light sensitive portions extending longitudinally of the film for producing a multiple channel sound film.

Other and further objects of my invention reside in a mechanism for reversibly feeding a light sensitive film past a shiftable prism adapted to refract light emitted through a variable shutter system in longitudinally extending tracks along the film, as set forth more fully in the specification hereinafter following by reference to the accompanying drawings, in which:

Figure 1 is a perspective view of the film moving mechanism of the recording apparatus of my invention showing the mechanism for transversely shifting the position of a refracting prism in the path of a variable light source for independently exposing different longitudinally extending tracks along the film; Fig. 2 is a theoretical view showing the optical system employed in the recording apparatus of my invention; Fig. 3 is a front view of the light recording head employed in the recording apparatus of my invention showing the shutter members closed under spring tension; Fig. 4 shows a front view of the light recording head with the shutter members open under control of the electromagnetic system; Fig. 5 shows the relationship of the refracting prism device and the light recording head with relation to the light sensitive film; and Fig. 6 is a view of the light recording head taken on line 6—6 of Fig. 5.

Referring to the drawings in detail, reference character 1 designates a frame structure on which parts of the film actuating mechanism are mounted and adjacent which the light recording head is supported. Rotatable shaft elements 2 and 3 are journaled on the frame structure 1 and carry the reels 4 and 5 on which the film 6 is wound. Guide rollers 7 and 8 serve to guide the film over the roller members 9 and 10 as shown. The roller members 9 and 10 each have sprocket teeth 9a and 10a which engage perforations in the film 6 for positively driving the film. Roller members 9 and 10 are positively driven through chains 11 and 12 which engage sprockets 14 and 15 respectively. An auxiliary frame structure 16 provides mounting means adjacent opposite ends thereof for the shafts 14a and 15a which carry the sprockets 14 and 15.

The power for driving the film is delivered from bevel gear 17 carried by the drive shaft 18 of motor 18' which engages bevel gear 19 on the vertically extending shaft 20, which shaft is journaled in the portions of the auxiliary frame 16 as represented at 21. The shaft 20 carries right and left hand driving clutches 22 and 23 which may be shifted endwise for engaging complementary clutches 24 and 25 on shafts 24a and 25a which are journaled in the portions 21a and 21b of the auxiliary frame 16. Bevel gears 24b and 25b are carried by shafts 24a and 25a and engage with bevel gears 14b and 15b on the sprocket shafts 14a and 15a. The frame 16 supports a box 48 which houses a timing element driven by the motor 18' through a spur gear mounted upon the shaft 18, adjacent the box 48, but not shown in the drawings. The timing element of the box 48 comprises mechanical means for imparting angular movement to a shift yoke 26 at predetermined recurring intervals with respect to the movement of the film 6. This timing element is described in detail in my co-pending application Serial No. 452,372, filed May 14, 1930, now Patent No. 1,853,381, and entitled Mechanical control apparatus.

A link mechanism 26a is angularly shifted by mechanism contained within casing 48 as set forth more fully in the aforesaid application for effecting angular movement of the yoke 26 for shifting disc member 27 as the film is unwound from one reel and stored on an opposite reel. The disc 27 is carried by the shaft 20. The shifting operation establishes engagement between one set of clutches while disengaging another set of clutches for driving the film in either of two opposite longitudinal directions. In the position shown, the yoke 25 is moved to a position shifting disc 27 for moving shaft 20 downwardly for effecting the engagement of clutch 23 with clutch 26. When the gear within the casing 48 has been driven to a predetermined limiting position simultaneously with the approach of the film to the end of the reels, yoke 26 shifts disc 27 and correspondingly moves shaft 20 for disengaging the clutches 23 and 25 shown in Fig. 1 and establishes engagement between clutches 22 and 24. This results in a reverse driving movement being imparted to the film 6. The yoke 26 is connected with the shaft 28 for imparting rocking movement thereto for swinging lever 29 to either of two limiting positions. The shaft 28 is journaled in bearing 30 connected to the frame 1. The lever 29 is slotted at 29a and is connected to link member 31 which connects to the carriage 32 carrying prism 33. The prism 33 is disposed in alignment with a light recording head indicated at 34. The light recording head 34 is mounted on suitable brackets 35 on the frame 1 of the sound recording apparatus. A horizontally projecting rod 36 extends from the light recording head 34 and provides means along which the carriage 32 may be reciprocated when moved under control of link member 31 by the shifting of the lever 29. The prism 33 may in this manner be aligned with either of two different longitudinal portions of the photo-sensitive film 6 for recording variable light in the channel 6a or the channel 6b. The light recording head 34 is provided with electromagnetic actuating means in the form of electromagnets indicated at 37 and 38 adapted to act on armature members 37a and 38a which connect to shutters 37b and 38b respectively. The shutters are normally maintained closed under spring tension by suitable springs represented at 39 and 40.

As shown more particularly in Fig. 3, variable voice currents developed in the voice control circuit indicated generally at 40 are amplified by the amplifier system 41 and passed through the windings of the electromagnets 37 and 38 for shifting the shutter members 37b and 38b for emitting variable light rays which are directed to the prism 33 and refracted therefrom to the light sensitive film 6. The details of the light recording head and the electromagnetic actuating mechanism therefor are set forth more fully in my copending application Serial No. 522,095, entitled Film and recording system therefor.

Fig. 3 in the drawings shows the light shutters 37b and 38b closed under conditions of no voice currents. Fig. 4 shows the condition existing as the amplitude of the voice currents increases and the shutters 37b and 38b are opened. Fig. 5 shows a lateral section through the light recording head and the carriage on which the prism 33 is mounted. The light recording head 34 includes the reflector 42, the light source 43, the condensing lens system 44, and the light slit 45 across which the shutters 37b and 38b operate. The carriage 32 on which prism 33 is mounted is shown shifted by means of link 29 and shaft 28 to a position where the prism 33 totally reflects the variable light beam to the portion of the film 6 indicated as the channel 6b. When the film reaches the limiting position in one direction of longitudinal travel, the prism 33 is shifted to a position in alignment with the portion of the film indicated as the channel 6a.

In Fig. 6, the cross-sectional view of the recording head has been shown looking in the direction of line 6—6 of Fig. 5, and showing the stub end of the projecting member 36 on which the carriage 32 which supports the prism 33 is adapted to slide.

The arrangement of the optical system will be more clearly understood from Fig. 2 where the light source 43 has been indicated in alignment with the condensing lens system 44 and in alignment with the light slit 45. The prism 33 has been shown directly in line with the optical system and in a position for refracting the rays of light from the source 43 to a position on film 6. It will be understood that the beam of light to which the film 6 is subjected is concentrated in a narrow channel, and the light sensitive emulsion subjected to a single beam of light in one selected channel independent of the adjacent selected channel. It will also be understood that in the construction of my apparatus the prism 33 and the film 6 can be positioned as closely as desired.

The entire recording apparatus is mounted in a light proof casing to prevent injury of the light sensitive emulsion on the film 6. The reels 4 and 5 are driven through belts 46 and 47. In the arrangement shown in Fig. 1, belt 47 is shown driving reel 5 so that the film 6 is moved downwardly. When the film reaches the end and the film has been unreeled from the reel 4 and reeled upon reel 5, the reverse mechanism in casing 48 operates to shift the angular position of the yoke 26 for operating upon the disc 27 to disengage clutches 23 and 25 and engage clutches 22 and 24 for driving the film in the opposite direction at the same time that prism 33 is shifted from a position for recording channel 6a to a position for recording channel 6b.

Certain features of the construction of my sound recording apparatus disclosed but not claimed in this application are claimed in my copending application Serial Number 443,398, filed April 11, 1930, of which this application is a continuation in part.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. Sound recording apparatus comprising a light sensitive film, reel mechanism for moving said film to a limiting position in one direction and automatically reversing the movement of said film for moving said film to a limiting position in the opposite direction, a stationary light recording head and a light reflecting device interposed between said light recording head and said film for subjecting said film to the action of variable light rays in one longitudinally extending track while said film is being moved in one direction, and means for automatically shifting the position of said light reflecting device for exposing said light sensitive film to light in an adjacent track when said film is being moved in an opposite direction.

2. Sound recording apparatus comprising a light sensitive film, reel mechanism for moving said film to a limiting position in one direction and automatically reversing the movement of said film for moving said film to a limiting position in the opposite direction, a stationary light recording head and a prism device interposed between said light recording head and said film for subjecting said film to the action of variable light rays in one longitudinally extending track while said film is being moved in one direction and means for automatically shifting the position of said prism device for exposing said light sensitive film to light in an adjacent track when said film is being moved in an opposite direction.

3. Sound recording apparatus comprising a light sensitive film, reel mechanism for moving said film to a limiting position in one direction and automatically reversing the movement of said film for moving said film to a limiting position in the opposite direction, a stationary light recording head, a carriage transversely slidable with respect to said film to either of two positions, a prism mounted on said carriage in the path of said variable light source for refracting a variable light beam in either of two channels on said film, and means for shifting the position of said carriage when said film has been moved to a limiting position.

4. Film apparatus comprising, a stationary source of light, means for varying the intensity of said light in accordance with a variable current, a photo-sensitive film, means for moving said film in either of two opposite directions, light directing means for directing said light upon said film in a beam of a width less than the width of said film, and means for relatively moving said light directing means and said film at predetermined time intervals for directing said light upon different longitudinal portions of said film.

5. A film apparatus comprising a stationary source of light, means for varying the intensity of said light in accordance with a variable current, a photo-sensitive film, means for longitudinally moving said film, means for defining said light in a beam less in width than the width of said film, light directing means for directing said beam of light upon said film, and means for relatively shifting said light directing means and said film at predetermined time intervals with respect to the longitudinal movement of said film.

In testimony whereof I affix my signature.
GORDON BROWN SCHEIBELL.